US011568564B2

(12) United States Patent
Zucker et al.

(10) Patent No.: US 11,568,564 B2
(45) Date of Patent: *Jan. 31, 2023

(54) MAPPING MULTIPLE VIEWS TO AN IDENTITY

(71) Applicant: NCR Corporation, Atlanta, GA (US)

(72) Inventors: Brent Vance Zucker, Roswell, GA (US); Adam Justin Lieberman, Suwanee, GA (US)

(73) Assignee: NCR Corporation, Atlanta, GA (US)

( * ) Notice: Subject to any disclaimer, the term of this patent is extended or adjusted under 35 U.S.C. 154(b) by 156 days.

This patent is subject to a terminal disclaimer.

(21) Appl. No.: 17/171,015

(22) Filed: Feb. 9, 2021

(65) Prior Publication Data

US 2021/0166425 A1 Jun. 3, 2021

Related U.S. Application Data

(63) Continuation of application No. 16/175,471, filed on Oct. 30, 2018, now Pat. No. 10,991,119.

(51) Int. Cl.
*G06T 7/73* (2017.01)
*G06Q 30/06* (2012.01)
*G06T 7/00* (2017.01)

(52) U.S. Cl.
CPC ........... *G06T 7/74* (2017.01); *G06Q 30/0639* (2013.01); *G06T 7/97* (2017.01); *G06T 2207/30232* (2013.01)

(58) Field of Classification Search
CPC ... G06T 7/74; G06T 7/97; G06T 2207/30232; G06T 2207/10016; G06T 2207/10024; G06T 2207/30196; G06T 7/292; G06Q 30/0639
See application file for complete search history.

(56) References Cited

U.S. PATENT DOCUMENTS

2011/0317982 A1* 12/2011 Xu ................ G06K 9/6224
386/E5.003
2015/0117835 A1* 4/2015 Yabuuchi ............... G06V 20/52
386/230

* cited by examiner

*Primary Examiner* — Chuong A Ngo
(74) *Attorney, Agent, or Firm* — Schwegman, Lundberg & Woessner

(57) ABSTRACT

Disclosed are systems and methods for mapping multiple views to an identity. The systems and methods may include receiving a plurality of images that depict an object. Attributes associated with the object may be extracted from the plurality of images. An identity of the object may be determined based on processing the attributes.

18 Claims, 3 Drawing Sheets

MAPPING MULTIPLE VIEWS TO AN IDENTITY

CROSS-REFERENCE TO RELATED APPLICATION

This application is a continuation of U.S. patent application Ser. No. 16/175,471, filed Oct. 30, 2018, which application and publication are incorporated herein by reference in their entirety.

BACKGROUND

Computer vision and image processing techniques have advanced in recent years. However, one difficult and unsolved processing task includes knowing when to associate one tracked item with another tracked item. This has been particularly difficult in frictionless store systems where decisions have to be made from the images as to whether an item captured in a first part of a store is the same item captured in a second part of the store.

SUMMARY

Disclosed are systems and methods for mapping multiple views to an identity. The systems and methods may include receiving a plurality of images that depict an object. Attributes associated with the object may be extracted from the plurality of images. An identity of the object may be determined based on processing the attributes.

BRIEF DESCRIPTION OF THE FIGURES

The above-mentioned and other features and advantages of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplifications set out herein illustrate exemplary embodiments of the invention, and such exemplifications are not to be construed as limiting the scope of the invention in any manner.

DETAILED DESCRIPTION

Figure 1:
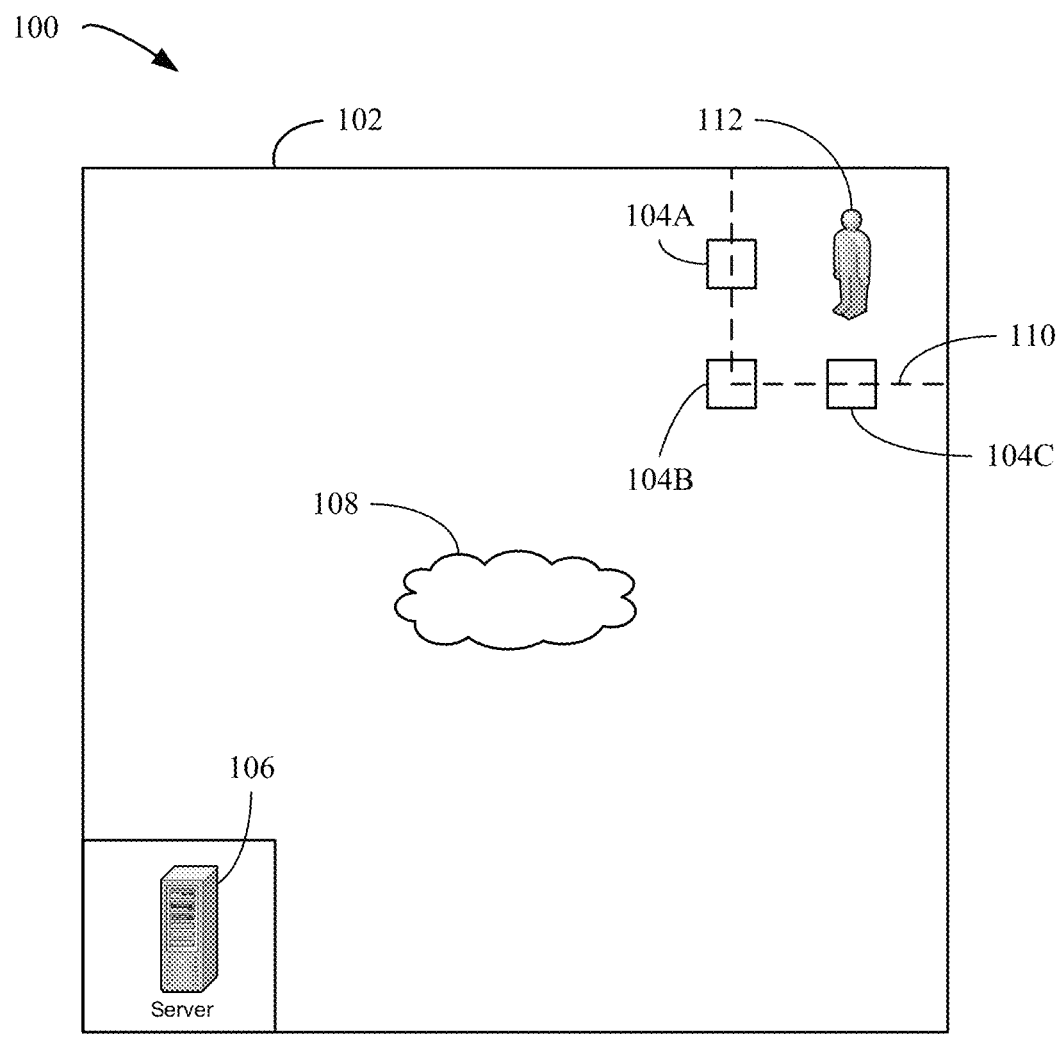
FIG. 1 shows an example operating environment consistent with this disclosure.

The following detailed description refers to the accompanying drawings. Wherever possible, the same reference numbers are used in the drawings and the following description to refer to the same or similar elements. While embodiments and examples are described, modifications, adaptations, and other implementations are possible. For example, substitutions, additions, or modifications may be made to the elements and stages illustrated in the drawings, and the systems and methods described herein may be modified by substituting, reordering, or adding stages to the disclosed methods or elements to the disclosed systems. Accordingly, the following detailed description does not limit this disclosure. Instead, the proper scope of any invention disclosed herein is defined by the appended claims.

When a shopper moves around a store they and the items they look at and hold look different from different angles. This problem of varying orientation makes recognizing a shopper or the products they look at and hold difficult using one or more cameras and a deep learning model. The system and methods disclosed herein allow for detecting and identifying a shopper or the items the look at and hold regardless of their orientation.

Deep learning models may perform well when objects are passed into a model preserving similar orientations. In a retail store, customers and the products within the store are never at a fixed orientation. As a result, identifying and tracking customers and products may produce incorrect results. The systems and methods disclosed herein may utilize multiple cameras to capture views of customers and items, map them to a distinct identity, and track and identify shoppers and products accurately.

As disclosed herein, a shopper may walk into a check-in area located within a store that is monitored by multiple cameras at different locations. At the check-in area the customer may be given an initial identification value. The multiple cameras may allow for multiple views of the customer to be captured. While the customer is in the check-in area, image crops of the customer, from multiple angles, may be sent to a deep learning-based model, such as an autoencoder, and an N dimensional feature vector, such as a 128 dimensional feature vector, from an encoder portion of the autoencoder may be returned.

These features with the original identification value may be sent to a K-Nearest Neighbors database. When the customer leaves the check-in area and is in the store area, their image crops may be sent to the encoder and this feature vector may be queried in the database with a Euclidean distance between the query and all alternate features in the database. The feature vector in the K-Nearest Neighbors database with the smallest distance to the query may be assigned as the identity of the customer or a product within the store.

FIG. 1 shows an example operating environment 100 consistent with this disclosure. As shown in FIG. 1, operating environment 100 may include a store 102. Within store 102 may be a first camera 104A, a second camera 104B, and a third camera 104C (collectively cameras 104) and a server 106. Cameras 104 may be in communications with server 106 via a network 108. Also, store 102 may also include a check-in area 110. While FIG. 1 shows three cameras, any number of cameras may be used to capture images of customer 112. In addition, cameras 104 may include cameras located throughout store 102 that may be used to capture images of customer 112 and products (not shown) located within store 102 as he or she walks through store 102.

During use, a customer 112 may enter store 102 and pass into check-in area 110. Upon entering store 102, cameras 104 may collect multiple images of customer 112. The images may be transmitted from cameras 104 to server 106 via network 108. The images may be cropped to remove extraneous imagery before being transmitted to server 106. For example, cameras 104 may include software and a processor that allow cameras 104 to quickly determine background scenery using images of known background elements to filter the background elements and allow cameras 104 to crop the images. The cropping of the images may also be performed by server 106 using the same or different techniques described with respect to cameras 104.

Upon being received at server 106, the images may be processed by an encoder that may extract attributes about an item in the images. As disclosed herein, the item may be customer 112 or a product located within store 102. Extracting attributes about the item may include determining color, text written on packaging or a shirt, hat, or other clothing worn by customer 112, a height of customer 112, approximate weight of customer 112, color of clothing worn by customer 112, size of packaging, etc. The number of attributed may be preset or may depend upon the images collected. For example, the number of attributes may be a set number such as 128. In another example, the number of attributes may be determined by the number of unique features that can be identified from the images. For instance, using a background reference, a height of the customer 112 as well as a color of his or her shirt, pants, shoes (including logos upon the shirt, pants, and shoes) may be uniquely identified from the images.

The attributes extracted from the images may be assigned an initial identification value and saved within an k-nearest neighbor (k-NN) database. As disclosed herein, the k-NN database may be saved on a memory of server 106 or may be stored offsite.

As customer 112 walks through store 102, additional images of customer 112, or an item customer 112 handles or looks at, may be captured by cameras 104. These new images may be received by server 106 and the encoder may extract features from the new images as described herein. The extracted attributes may be stored in a feature vector and assigned a temporary identification value.

The feature vector and the temporary identification value may be submitted to server 106 as a query. Server 106 may then determine which of the feature vectors stored in the k-NN database the feature vector associated with the temporary identification value is closest to and thus determine that the item in the second set of images is the item (i.e., customer 112 in this example). Stated another way, server 106 may determine the identity of customer 112 as he or she moves throughout store 102 by consistently mapping attributes from a plurality of images collected as customer 112 walks through store 102 using the attributes and an initial set of attributes stored in the k-NN database.

As disclosed herein, cameras 104 may be located throughout store 102 and may be used to capture images of customer 112 and/or products located throughout store 102. Cameras 104 may be oriented at different angles to one another. Thus, cameras 104 may be able to capture images of customer 112 and products at different angles. Images from different angles may be of different quality. As a result, different images may be better than others in terms of attributes that may be extracted. For example, a camera located about five feet from the floor and facing customer 112 may capture facial features of customer 112 better than a camera located on the ceiling and looking down at customer 112.

Using server 106 in conjunction with cameras 104 customer 112 can be tracked throughout store 102. The departments visited and the items customer 112 looks at or handles may be tracked and stored in a user profile. The user profile may be used to target ads, coupons, etc. to customer 112.

When customer 112 exits store 102 the initial feature vector and initial identification value may be flushed from the k-NN database. The flushing of customer 112's information may allow for faster processing of other feature vectors as they cannot be a match to customer 112's attributes if he or she has left store 102.

Figure 2:
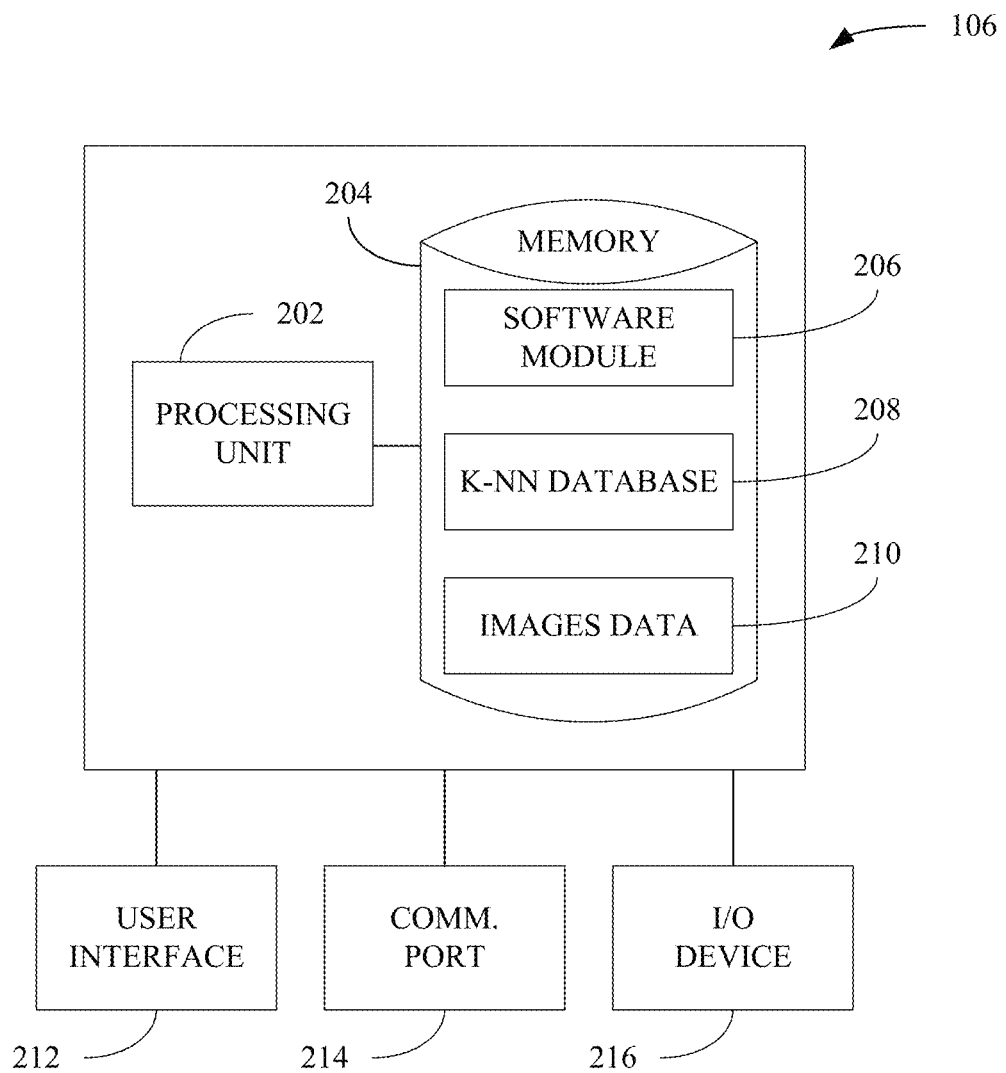
FIG. 2 shows an example schematic of a server consistent with this disclosure.

FIG. 2 shows an example schematic of server 106. As shown in FIG. 2, server 106 may include a processing unit 202 and a memory 204. The memory 204 may include a software module 206, a k-NN database 208, and images data 210. While executing on processing unit 202, the software module 206 may perform processes for mapping multiple views to an identity, including, for example, one or more stages included in a method 300 described below with respect to FIG. 3. Server 106 may also include a user interface 212, a communications port 214, and an input/output (I/O) device 216.

As disclosed herein, k-NN database 208 may include a plurality of feature vectors. The feature vectors may be created by an encoder that may be part of software module 206. The feature vectors may include the various attributes that are extracted from a plurality of images as disclosed herein. The feature vectors may have the same dimensions or may have different dimensions. For example, the feature vectors for the products located in store 112 may all have the same dimensions. Feature vectors generated by the encoder for each customer that enters store 102 via check-in area 110 may have differing dimensions depending on the number of attributes the encoder is able to extract from the images captures via cameras 104.

Images data 210 may include the images captured by cameras 104 and data associated with those images. For example, images data 210 may include the images, data that identifies the camera that captured each of the images, a time stamp for each image, and an identification value. The data that identifies the camera that captured each of the images, may also include an angle the camera that captured an image is oriented to relative to an item captured in the image and a location of the camera within a store.

User interface 212 can include any number of devices that allow a user to interface with server 106. Non-limiting examples of user interface 212 include a keypad, a microphone, a display (touchscreen or otherwise), etc.

Communications port 214 may allow server 106 to communicate with various information sources and devices, such as, but not limited to, remote computing devices, mobile devices, peripheral devices, etc. Non-limiting examples of communications port 214 include, Ethernet cards (wireless or wired), Bluetooth® transmitters and receivers, near-field communications modules, etc. User interface 212 may also use communications port 214 to communicate with server 106. For example, user interface 212 may be a tablet computer that includes a virtual keyboard that communicates with server 106 via communications port 214.

I/O device 216 may allow server 106 to receive and output information. Non-limiting examples of I/O device 216 include, a camera (still or video such as cameras 104), a weight detection device such as a scale, a printer for printing receipts and packing lists, a scanner, etc.

Figure 3:
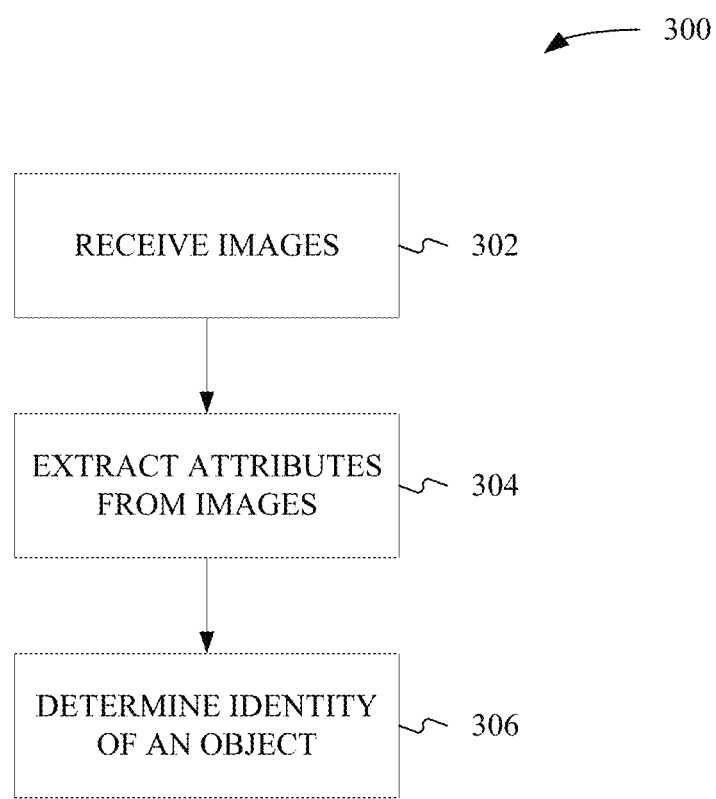
FIG. 3 shows an example method consistent with this disclosure.

FIG. 3 shows an example method 300 consistent with this disclosure. Method 300 may begin at stage 302 where a plurality of images may be received. For example, cameras, such as cameras 104, may capture images of an item, such as a customer or a product handled by the customer within a store, such as store 102, and transmit the images to a server, such as server 106. For instance, as disclosed herein, when customer 112 enters store 102 via check-in area 110, cameras 104 may capture various images of customer 112 and transmit the images to server 106.

From stage 302, method 300 may proceed to stage 304 where attributes may be extracted from the images. For instance, server 106 may use known images of the background to remove background elements from the images and crop the images. In addition, the server 106 may use object character recognition to read labels on products customer 112 may be holding or text on clothing customer 113 is wearing.

Part of the extraction of the attributes may include saving the various attributes in a feature vector. As disclosed herein, the feature vector may be an N dimensional vector where each dimension represents a unique attribute. Each dimension of the vector may also have an associated confidence interval. For example, for later testing to determine an identity of customer 112 or of a product being held by a customer, a result of a test, statistical or otherwise, may been to fall within a 95% confidence band in order to be a match or deemed a positive identification. As disclosed herein, the extraction of the attributes may be done using image analysis, pattern recognition, etc.

Another part of the extraction of the attributes may include saving the attributes to a K-NN database, such as k-NN database 208. For instance, when customer 112 first enters store 102, attributes extracted from images of customer 112 taken while customer 112 is located in check-in area 110 may be saved as the baseline attributes for later testing. Thus, as customer 112 walks through store 112 the baseline attributes can be used for later testing of attributes extracted from new images to determine in customer 112 is in the new images.

From stage 304 method 300 may proceed to stage 306 where an identity of an item may be determined. As disclosed herein, the item may be a customer, such as customer 112, or a product in the store that the customer may look at. The identity of the item may be determined by processing the attributes as disclosed herein.

Determining the identity of the item may include querying a k-NN database, such as k-NN database 208. Querying the k-NN database may include passing a feature vector containing attributes extracted from one or more images. For example, as the customer walks through the store and images are collected, those images may be processed as disclosed herein and attributes extracted and saved into a feature vector. This feature vector may be passed to the k-NN database and compared with other feature vectors stored within the k-NN database. The comparison of the feature vectors may result in the feature vector that was submitted as part of the query being closest to one of the feature vectors previously stored in the k-NN database. The identity of the item would then be assigned to the identity of the nearest neighbor in the k-NN database.

For instance, suppose there are 100 feature vectors saved in the k-NN database and each of the 100 feature vectors include attributes for 100 customers within the store. One of those 100 feature vectors were saved to the k-NN database when the customer entered the store and his or her attributes were extracted from images taken while the customer was in the check-in area. When new images are taken of the customer, say in the produce section of the store, attributes from those images may be extracted and stored as a new feature vector, which is then passed to the k-NN database as a query. The server will then determine which of the 100 feature vectors saved in the k-NN database the new feature vector is closest too. The identity of whichever of the 100 feature vectors the new feature vector is closest too will be assigned as the identity of the customer.

Part of the query process may include determining a Euclidean distance between the new feature vector and the vectors stored in the k-NN database. The shortest distance may be used to select the identity of the customer. In addition, and as disclosed herein, confidence intervals can be used to aid in assigning the identity of the customer. For instance, some of the attributes may be weighted. For example, text on the customer shirt may be given a higher weight than an estimated height of the customer because the text may be easier to extract from images and may be more accurately extracted than a height. Thus, a match of a text attribute may be weighted more than an estimate of the customer's height.

EXAMPLES

Example 1 is a method comprising: receiving a plurality of images that depicts an object; extracting attributes associated with the object from the plurality of images; determining, based on processing the attributes, an identity of the object.

In Example 2, the subject matter of Example 1 optionally includes wherein the object is an item for purchase located in a store or a person located inside the store.

In Example 3, the subject matter of any one or more of Examples 1-2 optionally include wherein receiving the plurality of images includes receiving the plurality of images from a plurality of camera located inside a store.

In Example 4, the subject matter of Example 3 optionally includes wherein each of the plurality of cameras is oriented at a different angle to on another.

In Example 5, the subject matter of any one or more of Examples 1-4 optionally include wherein extracting the attributes includes storing the attributes in an N dimensional vector.

In Example 6, the subject matter of any one or more of Examples 1-5 optionally include wherein determining, based on processing the attributes, the identity of the object includes processing an N dimensional vector including the attributes.

In Example 7, the subject matter of any one or more of Examples 1-6 optionally include wherein determining, based on processing the attributes, the identity of the object includes: querying a K-nearest neighbors database with an N dimensional vector including the attributes; and assigning the identity of the object to the object based on a feature vector stored in the K-nearest neighbors database having a shortest distance to the N dimensional vector.

In Example 8, the subject matter of Example 7 optionally includes calculating a Euclidean distance between the N dimensional vector and a plurality of feature vectors stored in the K-nearest neighbors database, the feature vector having the shortest distance to the N dimensional vector being one of the plurality of feature vectors.

In Example 9, the subject matter of Example 8 optionally includes wherein assigning the identity of the object to the object includes determining when the Euclidean distance is within a confidence interval.

In Example 10, the subject matter of any one or more of Examples 1-9 optionally include cropping at least one of the plurality of images before extracting the attributes.

Example 11 is a system comprising: a plurality of cameras arranged to capture images within a store; a server that includes a processor; and a non-transitory computer-readable storage medium storing instructions that, when executed by the processor, cause the server to perform operations comprising: receiving a plurality of images that depicts an object; extracting attributes associated with the object from the plurality of images; determining, based on processing the attributes, an identity of the object.

In Example 12, the subject matter of Example 11 optionally includes wherein the object is an item for purchase located in a store or a person located inside the store.

In Example 13, the subject matter of any one or more of Examples 11-12 optionally include wherein receiving the plurality of images includes receiving the plurality of images from a plurality of camera located inside a store.

In Example 14, the subject matter of Example 13 optionally includes wherein each of the plurality of cameras is oriented at a different angle to on another.

In Example 15, the subject matter of any one or more of Examples 11-14 optionally include wherein extracting the attributes includes storing the attributes in an N dimensional vector.

In Example 16, the subject matter of any one or more of Examples 11-15 optionally include wherein determining, based on processing the attributes, the identity of the object includes processing an N dimensional vector including the attributes.

In Example 17, the subject matter of any one or more of Examples 11-16 optionally include wherein determining, based on processing the attributes, the identity of the object includes: querying a K-nearest neighbors database with an N dimensional vector including the attributes; and assigning the identity of the object to the object based on a feature vector stored in the K-nearest neighbors database having a shortest distance to the N dimensional vector.

In Example 18, the subject matter of Example 17 optionally includes calculating a Euclidean distance between the N dimensional vector and a plurality of feature vectors stored in the K-nearest neighbors database, the feature vector having the shortest distance to the N dimensional vector being one of the plurality of feature vectors.

In Example 19, the subject matter of Example 18 optionally includes wherein assigning the identity of the object to the object includes determining when the Euclidean distance is within a confidence interval.

In Example 20, the subject matter of any one or more of Examples 11-19 optionally include wherein the plurality of cameras are arranged within a check-in area of the store.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

The invention claimed is:

1. A method comprising:
receiving a plurality of images that depict an object;
receiving a background image;
extracting attributes associated with the object from the plurality of images by removing items in the background image from the plurality of images;
assigning a temporary identification value to the object; and
determining, based on processing the attributes, an identity of the object based on a query having the attributes and the temporary identification value as inputs, wherein determining, based on processing the attributes, the identity of the object includes:
querying a K-nearest neighbors database with an N dimensional vector including the attributes and the temporary identification value, wherein N is an integer, and
assigning the identity of the object to the object based on a feature vector stored in the K-nearest neighbors database having a shortest distance to the N dimensional vector.

2. The method of claim 1, wherein the object is an item for purchase located in a store or a person located inside the store.

3. The method of claim 1, wherein receiving the plurality of images includes receiving the plurality of images from a plurality of cameras located inside a store.

4. The method of claim 3, wherein each of the plurality of cameras is oriented at a different angle to one another.

5. The method of claim 1, wherein extracting the attributes includes storing the attributes in the N dimensional vector.

6. The method of claim 1, wherein determining, based on processing the attributes, the identity of the object includes processing the N dimensional vector including the attributes.

7. The method of claim 1, further comprising calculating a Euclidean distance between the N dimensional vector and a plurality of feature vectors stored in the K-nearest neighbors database, the feature vector having the shortest distance to the N dimensional vector being one of the plurality of feature vectors.

8. The method of claim 7, wherein assigning the identity of the object to the object includes determining when the Euclidean distance is within a confidence interval.

9. The method of claim 1, further includes cropping at least one of the plurality of images before extracting the attributes.

10. A system comprising:
a plurality of cameras arranged to capture images within a store;
a server that includes a processor; and
a non-transitory computer-readable storage medium storing instructions that, when executed by the processor, cause the server to perform operations comprising:
receiving a plurality of images that depicts an object from the plurality of cameras, receiving a background image;
extracting attributes associated with the object from the plurality of images,
assigning a temporary identification value to the object, and
determining, based on processing the attributes, an identity of the object based on a query having the attributes and the temporary identification value as inputs;
wherein determining, based on processing the attributes, the identity of the object includes:
querying a K-nearest neighbors database with an N dimensional vector including the attributes and the temporary identification value, wherein N is an integer; and
assigning the identity of the object to the object based on a feature vector stored in the K-nearest neighbors database having a shortest distance to the N dimensional vector.

11. The system of claim 10, wherein the object is an item for purchase located in the store or a person located inside the store.

12. The system of claim 10, wherein each of the plurality of cameras is oriented at a different angle to on another.

13. The system of claim 10, wherein extracting the attributes includes storing the attributes in the N dimensional vector.

14. The system of claim 10, wherein determining, based on processing the attributes, the identity of the object includes processing the N dimensional vector including the attributes.

15. The system of claim 10, wherein the plurality of cameras are arranged within a check-in area of the store.

16. The system of claim 10, wherein extracting attributes associated with the object from the plurality of images includes extracting a color of the object, text written on the object, an approximate height of the object, and an approximate weight of the object.

17. The system of claim 10, further comprising calculating a Euclidean distance between the N dimensional vector and a plurality of feature vectors stored in the K-nearest neighbors database, the feature vector having the shortest distance to the N dimensional vector being one of the plurality of feature vectors.

18. The system of claim 17, wherein assigning the identity of the object to the object includes determining when the Euclidean distance is within a confidence interval.

\* \* \* \* \*